(12) United States Patent
Antoine et al.

(10) Patent No.: US 11,713,104 B2
(45) Date of Patent: Aug. 1, 2023

(54) LATCH FOR AIRCRAFT PANEL

(71) Applicant: LISI AEROSPACE, Paris (FR)

(72) Inventors: Jimmy Antoine, Saint-Doulchard (FR); Vincent Defrance, Preuilly (FR)

(73) Assignee: LISI AEROSPACE, Paris (FR)

( * ) Notice: Subject to any disclaimer, the term of this patent is extended or adjusted under 35 U.S.C. 154(b) by 0 days.

(21) Appl. No.: 17/202,358

(22) Filed: Mar. 16, 2021

(65) Prior Publication Data

US 2021/0291954 A1 Sep. 23, 2021

(30) Foreign Application Priority Data

Mar. 17, 2020 (FR) ........................................ 2002593

(51) Int. Cl.
*B64C 1/14* (2006.01)
*F16B 5/00* (2006.01)
*E05C 3/04* (2006.01)

(52) U.S. Cl.
CPC ................ *B64C 1/14* (2013.01); *E05C 3/048* (2013.01); *F16B 5/008* (2013.01); *F16B 5/0084* (2013.01); *Y10T 403/608* (2015.01)

(58) Field of Classification Search
CPC ... B64C 1/14; E05C 3/048; E05C 1/12; E05C 3/02; E05C 3/04; E05C 3/047; E05C 3/122; E05C 3/14; E05C 19/10; E05C 19/12; E05C 19/14; E05C 19/145; F16B 5/008; F16B 5/0084; Y10T 403/0084; B64D 29/06; B64D 47/00; F16M 13/022; E05B 13/002; E05B 5/00; E05B 7/00; E05B 17/025; E05B 15/006
See application file for complete search history.

(56) References Cited

U.S. PATENT DOCUMENTS 2,337,531 A * 12/1943 Stockton ................. E05C 3/122
                                                                               292/DIG. 31
2,479,921 A * 8/1949 Gander ................... E05C 3/122
                                                                               292/DIG. 31

(Continued)

FOREIGN PATENT DOCUMENTS

| FR | 1070235 | 7/1954 |
|---|---|---|
| FR | 2556399 | 12/1983 |
| FR | 2605671 | 4/1988 |

OTHER PUBLICATIONS

Van Beurden, Jason, French Preliminary Search Report, dated Dec. 7, 2020, 2 pages, French Institute of Intellectual Property, Courbevoie, France.

*Primary Examiner* — Medhat Badawi
*Assistant Examiner* — Vicente Rodriguez
(74) *Attorney, Agent, or Firm* — Henricks Slavin LLP

(57) ABSTRACT

A latch (12) intended for assembling a removable panel (18) to a structure (14), notably that of an aircraft, includes a bracket (30) fixed to the panel; a keeper (32) and a push button (34) hinged to the bracket; a torsion spring (40) comprising two arms respectively in abutment on the keeper and the push button. The latch is movable between a closed configuration, in which the keeper is in contact with the push button, and an open configuration, in which the keeper is spaced apart from the push button. The latch further includes a roller (42) rotatably supported on an arm (86) of the spring; and the keeper includes a profile (58) on which the roller moves when the latch is moved between the closed and open configurations.

13 Claims, 4 Drawing Sheets

(56) References Cited

U.S. PATENT DOCUMENTS

| | | | | |
|---|---|---|---|---|
| 2,717,796 | A | * | 9/1955 | Cudney .................. E05C 3/122 |
| | | | | 292/DIG. 31 |
| 2,722,445 | A | | 11/1955 | Cudney |
| 6,343,815 | B1 | * | 2/2002 | Poe ...................... E05C 19/145 |
| | | | | 292/DIG. 31 |
| 8,544,900 | B2 | * | 10/2013 | Elbrecht ................ E05C 3/048 |
| | | | | 292/202 |
| 8,857,230 | B1 | * | 10/2014 | Misner ................ E05B 17/0025 |
| | | | | 292/DIG. 60 |
| 9,169,678 | B2 | * | 10/2015 | Rozema ................ E05B 51/023 |

* cited by examiner ns shown, the rotating body 53, 153 comprises two walls
LATCH FOR AIRCRAFT PANEL The present invention concerns a latch intended for assembling a removable panel to a structure, in particular to an aircraft structure, of the type comprising: a bracket capable of being fixed to the panel; a keeper hinged to the bracket to rotate around a first axis; a push button hinged to the bracket to rotate around a second axis parallel to the first axis; a spring, comprising a first and second arm connected by at least one intermediate portion, one end of each of the said first and second arms in abutment respectively on the keeper and on the push button. The latch is movable between a closed configuration, in which the keeper is in contact with the push button, and an open configuration, in which the keeper is distanced from the push button. The stress of the spring in the closed configuration is greater than the stress of said spring in the open configuration.

This latch type is also referred to in documents FR2556399 and FR2605671.

The spring for this type of latch is generally subject to high mechanical stresses due to a large deflection of the spring arms between the closed and open configurations. These stresses shorten the service life of the latch.

The purpose of the present invention is to provide an improved latch with a longer service life for the spring.

For this purpose, the invention concerns a latch of the type as mentioned above, wherein: at least one intermediate portion of the spring is disposed around the second axis; the latch also comprises one or a plurality of moving surfaces connected to an arm or respective arms, and in one example the latch comprises a moving surface connected to the end of the first arm; and the keeper comprises a moving profile in contact with the moving surface in the closed and open positions of the latch, said moving surface being capable of moving on the moving profile when said latch moves between the closed and open configurations.

Among other advantageous aspects of the invention, the latch comprises one or more of the following features, taken individually or in accordance with all technically possible combinations:

- the moving surface comprises a roller rotatably supported at the end of the first arm, along a third axis parallel to the second axis;
- the moving profile comprises a first and a second end, said second end being in contact with the moving surface in the open configuration, the distance between the first axis and the second end being less than the distance between the first axis and the first end;
- the moving profile further comprises an intermediate area near the first end, the distance between the first axis and the second end being less than the distance between the first axis and the intermediate area;
- the distance between the second and third axes is less than the distance between the first and second axes;
- the first and second arms of the spring form a first angle in the closed configuration and a second angle in the open configuration, the difference between the first and second angles being less than 60°, preferably less than 30° and ideally less than 20°;
- the first arm of the spring comprises two substantially parallel branches, with the roller positioned between said two branches;
- the keeper comprises two walls traversed by the first axis;
- the moving profile of the keeper comprises a part placed between the two walls and is fixed to said two walls;
- the spring is a torsion spring, and the intermediate portion is a helical portion.

The invention also relates to an aircraft comprising: a structure; a panel movable relative to said structure; and a latch as described above, said latch being attached to the panel such that in the closed configuration of the latch, said latch prevents the opening of the panel relative to the structure.

The invention will be better understood after reading the following description, which is provided as a non-limiting example only, and with reference to the following drawings, in which.

Figure 1:
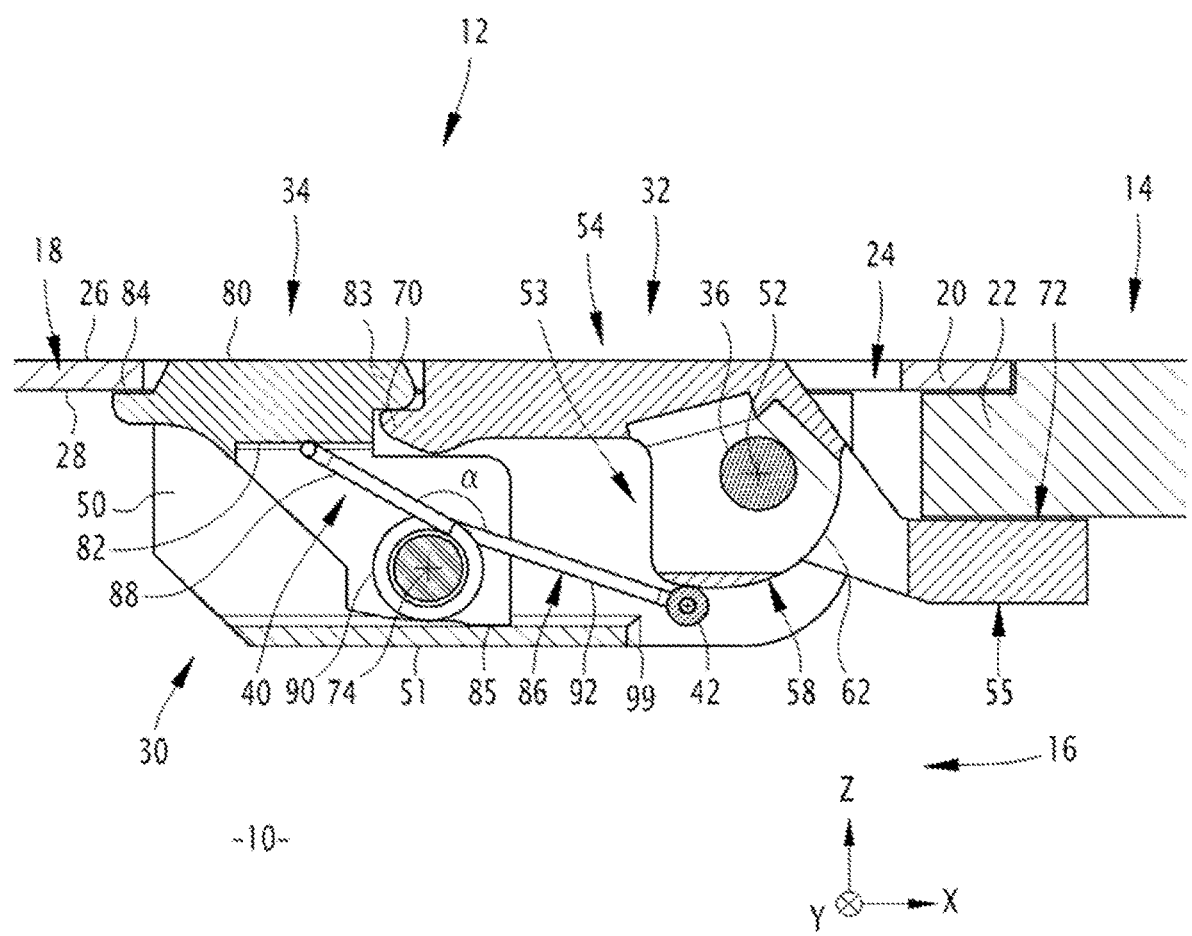
FIG. 1 is a detailed, sectional view of an aircraft comprising a latch according to a first embodiment of the invention, in a first configuration.

FIG. 1 illustrates an aircraft 10 comprising a latch 12 according to an embodiment of the invention. More specifically, the aircraft 10 also includes: a structure 14, in which a compartment 16 is installed; and a panel 18, hinged to the structure 14 and capable of opening and closing the compartment 16. In a closed configuration of said compartment 16, visible in FIG. 1, an edge 20 of the panel 18 is in contact with an edge 22 of structure 14.

Near to the edge 20, the panel 18 comprises a through-hole 24, preferably with a closed contour.

As specified hereafter, the latch 12 is assembled to the panel 18. To continue the description, an orthonormal basis (X, Y, Z) associated with the panel 18 and the latch 12, with the Z direction representing the vertical, are shown.

As represented here the panel 18 comprises an upper face 26 and a lower face 28, each of said faces lying substantially in a plane (X, Y). In the closed configuration shown in FIG. 1, the lower face 28 is oriented towards the compartment 16.

Figure 2:
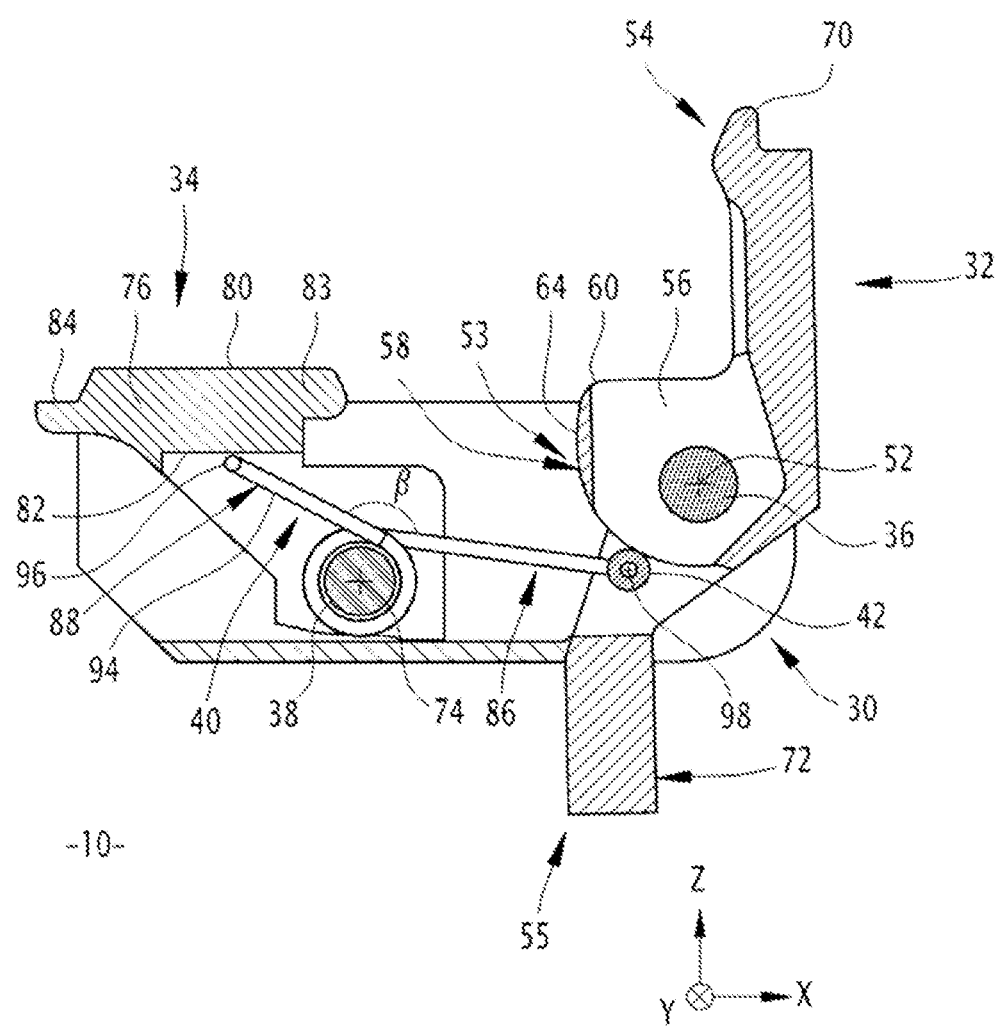
FIG. 2 is a sectional view of the latch shown in FIG. 1, in a second configuration.
Figure 3:
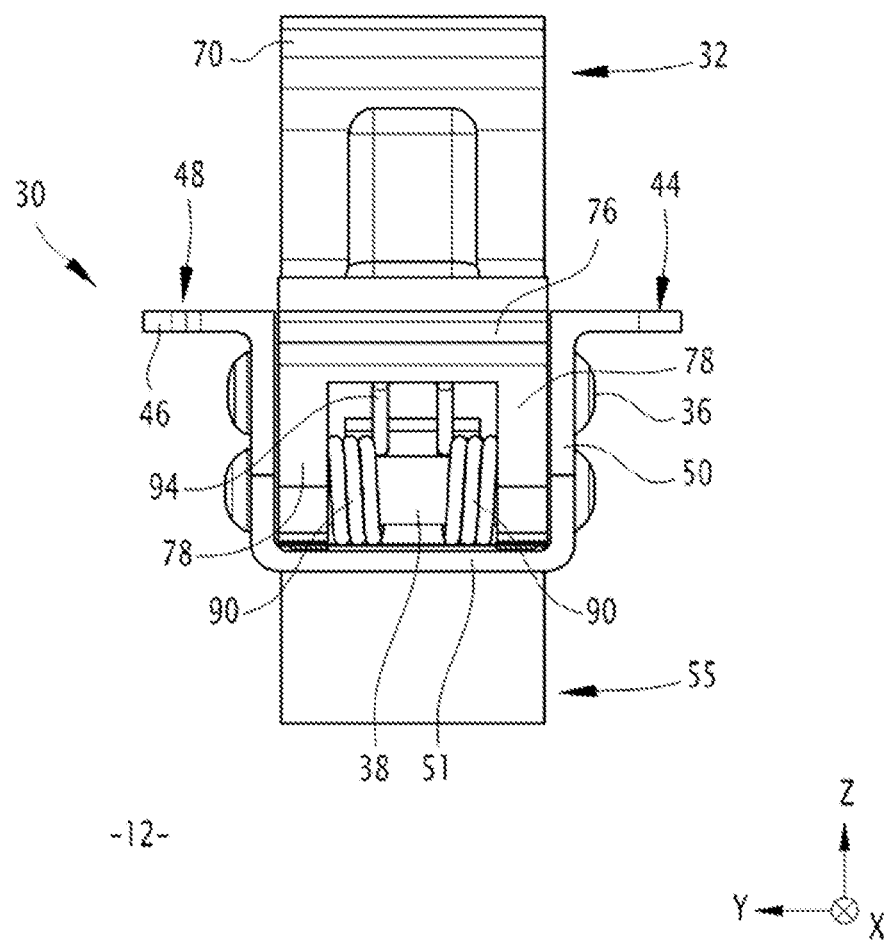
FIG. 3 is the end-view of the latch in FIGS. 1 and 2 in the second configuration.

The latch 12, also shown in FIGS. 2 and 3, comprises: a bracket 30; a keeper 32; a push button 34; a first rivet 36; a second rivet 38; a spring 40; and a moving surface. In the embodiment shown, the moving surface is a roller 42.

The bracket 30 comprises a surface 44 for attachment to the panel 18, said surface 44 extending substantially in a plane (X, Y). Specifically, as shown in FIG. 3, the bracket 30 has a substantially U-shape, with two upper tabs 46 forming the attachment surface 44. The tabs 46 have holes 48 for attachment to the panel 18.

The bracket 30 also comprises two flanks 50, each flank extends substantially in a plane (X, Z). The tabs 46 form the upper end of each flank 50. The bracket 30 also has a bottom 51, substantially positioned in a plane (X, Y) and connected to the lower ends of both the flanks 50.

The keeper 32 can be rotated relative to the bracket 30 around a first rotation axis 52, parallel to the Y direction. Specifically, the keeper 32 is positioned between the two flanks 50 of the bracket. The first axis 52 is embodied by the first rivet 36, which connects said two flanks 50.

Figure 4:
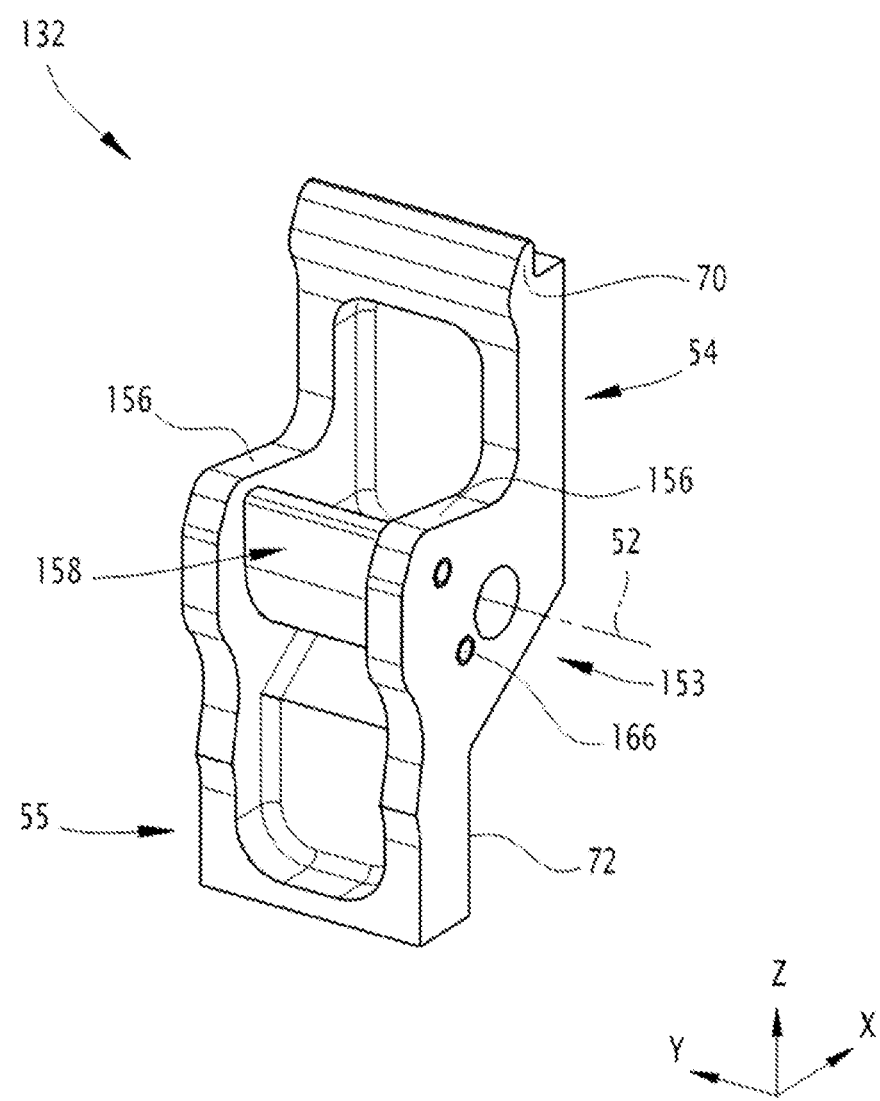
FIG. 4 is a perspective view of the latch keeper according to the second embodiment of the invention.

FIG. 4 depicts the keeper 132 as a variant embodiment of the invention. The keeper 132 is compatible for replacing the keeper 32 in the latch 12. Keeper 32 and keeper 132 will be described simultaneously hereinafter, the common elements being designated by the same reference numbers.

Keeper 32, 132 consists of: a rotating body 53, 153, a first extension 54 and a second extension 55.

The rotating body 53, 153 is traversed by the first rivet 36, which constitutes the first axis 52 of rotation. In the embodiments shown, the rotating body 53, 153 comprises two walls 56, 156, positioned at each end of the first rivet 36, with a space between said two walls.

The rotating body 53, 153 comprises a moving profile, specifically a convex curved profile 58, 158. The curved profile 58, 158 has a substantially arc-shaped cross-section with one or more radii, one concave part of which is oriented towards the first axis 52. As a variant that is not shown, the moving profile may comprise an inclined plane.

The curved profile 58, 158 extends between a first end 60 and a second end 62, the second end 62 being closer to the first axis 52 than the first end 60.

The curved profile 58, 158 also comprises an intermediate area 64, close to the first end. The second end 62 is closer to the first axis 52 than the intermediate area 64. The intermediate area 64 is preferably closer to the first axis 52 than the first end 60.

The convex curved profile 58, 158 preferably has no concave sections.

In the embodiment shown in FIGS. 1 to 3, the curved profile 58 of the keeper 32 is formed from one part with the walls 56 of the rotating body 53. For example, the curved profile 58 comprises an edge of said walls.

In the embodiment shown in FIG. 4, the curved profile 158 of the keeper 132 is formed by an insert, which is placed between the walls 156 of the rotating body 153 and fixed to said walls. It is fastened by the means of the rivets 166, for example.

Each of the first 54 and second 55 extensions of the keeper 32, 132 extends from the rotating body 53, 153, in a direction substantially perpendicular to the first axis 52. The first 54 and second 55 extensions are located on either side of a plane passing through the first axis 52.

The first extension 54 of keeper 32, 132 has a first tab 70, forming a free end of said first extension.

The second extension 55 of the keeper 32, 132 comprises a contact surface 72.

In the embodiments shown, the said contact surface 72 is flat.

The push button 34 can be rotated relative to the bracket 30 around a second rotation axis 74, parallel to the Y direction. Specifically, the push button 34 is positioned between the two flanks 50 of the bracket. The second axis 74 is embodied by the second rivet 38, which connects said two flanks 50.

The push button 34 is generally U-shaped, comprising a central element 76 and two side elements 78 connected by said central element.

The central element 76 comprises a thrust surface 80 and a bearing surface 82, facing away from each other in the Z-direction. The central element 76 also comprises a second tab 83, protruding from the central element 76 in the plane (X, Y). Each side end of the central element is connected to a side element 78.

The side elements 78 are separated from each other in the Y-direction, each of said side elements 78 being traversed by the second rivet 38.

The push button comprises at least one stop 84, 85, formed by a surface parallel to the plane (X, Y). In the embodiment shown, the central element 76 comprises a first stop 84; and opposite said central element, each of the side elements comprises a second stop 85. The surface of the first stop 84 and the surfaces of the second stops 85 are facing opposite directions in the Z-direction.

The spring 40 is a torsion spring, e.g. made of metal wire. The torsion spring 40 comprises a first arm 86 and a second arm 88 connected by at least one intermediate portion, in this case an helical portion 90. At least one helical portion is positioned around the second rivet 38, between the side elements 78 of the push button. The helical portion comprises at least one coil and preferably several coils.

In the embodiment represented, the first arm 86 and the second arm 88 each have two branches 92, 94 substantially parallel in the plane (X, Z). In addition, the spring 40 comprises two helical portions 90, each of which is positioned in the Y-direction between a branch 92 of the first arm and a branch 94 of the second arm.

The ends of the branches 94 of the second arm 88 are joined together to form one end 96 of the second arm.

The roller 42 is rotatably supported on the ends or inward from the end of the branches 92 of the first arm 86, said ends embodying a third axis 98 of rotation, parallel to the Y direction. The distance between the second axis 74 and the third axis 98 is less than the distance between the second axis 74 and the first axis 52. Thus, the axis 98 of the roller is offset in the X direction relative to the first axis 52 of the keeper.

In the embodiment shown in FIG. 1, the latch 12 is assembled to the panel 18. Specifically, the attachment surface 44 of the bracket 30 is fastened to the lower side 28 of the panel, so that the keeper 32 and thrust surface 80 of the push button 34 are positioned facing the orifice 24 of said panel.

FIG. 1 shows the latch 12 in a first configuration, referred to as closed, corresponding to the closed configuration of the compartment 16.

In the closed configuration of the latch 12, the end 96 of the second arm 88 of the spring 40 is in contact with the bearing surface 82 of the push button 34; and the roller 42 is in abutment with the intermediate area 64 of the curved profile 58 of the keeper 32. The first arm 86 and the second arm 88 of the spring form a first angle with each other α.

In said closed configuration, a force exerted by the spring 40 on the push button 34 tends to raise the bearing surface 82. In addition, the roller 42 exerts, on the curved profile 58 of the keeper 32, a normal force on the surface of said roller. The said force tends to rotate the keeper 32 by raising the first extension 54 of the said keeper, comprising the first tab 70.

In the closed configuration of the compartment 16, the first stop 84 and the second stop 85 of the push button 34 are respectively in contact with the lower side 28 of panel 18 and the bottom 51 of the bracket. In addition, the upper surface of the first tab 70 of the keeper 32 is in contact with the lower surface of the second tab 83 of the push button 34.

This contact rotationally locks the push button 34 and the keeper 32. A first torsional stress is thus applied to the arms 86, 88 from the spring 40.

Furthermore, in the closed configuration of the compartment 16, the contact surface 72 of keeper 32 is in contact with the edge 22 of the structure 14 of the aircraft 10, to prevent raising the edge 20 of the panel 18 from said structure. Said panel 18 is thus locked in the closed configuration.

The latch 12 and the panel 18 are preferably configured so that in the closed configuration of the compartment 16, the keeper 32 and the thrust surface 80 of the push button 34 are flush with the upper face 26 of the panel.

FIGS. 2 and 3 show the latch 12 in a second configuration, referred to as open. The open configuration of the latch 12 corresponds to an unlocked open position of the panel 18. Said panel and the structure 14 are not shown in FIGS. 2 and 3.

In the open configuration of the latch 12, the keeper 32 is in a different angular position to the closed configuration, relative to the bracket 30. Specifically, in the open configuration of the latch, the first keeper extension 54 and second keeper extension 55 have rotated around the first axis 52, and the keeper 32 extends in a median plane substantially perpendicular to the bottom 51 of the bracket. The first tab 70 of the keeper 32 is separated from the second tab 83 of the push button 34; and the contact surface 72 of the keeper is separated from the structure 14 of the aircraft 10. The contact surface 72 abuts the edge 99 of the bottom 51, which limits the rotation of the keeper around the first axis 52.

In the open configuration of the latch 12, the end 96 of the second arm 88 of the spring 40 remains in contact with the bearing surface 82 of the push button 34; and the roller 42 is in abutment with the second end 55 of the curved profile 53 of the keeper 32. A second torsional stress is thus applied to the arms 86, 88 of the spring 40. The said second stress is less than the first stress corresponding to the closed configuration of the latch 12.

The first arm 86 and the second arm 88 of the spring form a second angle with each other β. In the embodiment shown, the second angle β is smaller than the first angle α corresponding to the closed configuration of the latch 12.

In absolute value, the difference between the first angle α and the second angle β is preferentially less than 60°, more preferentially less than 30°, and ideally less than 20°.

The operating procedure for the latch 12 of the aircraft 10 will now be described. We consider an initial state in which the compartment 16 and the latch 12 are in a closed configuration.

To unlock the panel 18 for the opening of the compartment 16, an operator applies pressure on the thrust surface 80 of the push button 34. The central element 76 of said push button is moved downwards, which corresponds in FIG. 1 to a counterclockwise rotation of the push button 34 around the second axis 74. During the said rotation of the push button, the stress applied to the torsion spring 40 increases. Similarly, the force exerted by the roller 42 on the moving profile of the keeper 32 increases. The roller 42 moves from the intermediate area 64 to the first end 60 of the curved profile 58.

The counterclockwise rotation of the push button 34 is continued until the second tab 83 of said push button disengages from the first tab 70 of the keeper 32. Said keeper, thus released, rotates under the force exerted by the roller 42 due to the offset of the roller axis and the first axis 52. In FIG. 1, this rotation corresponds to a clockwise rotation of keeper 32 around the first axis 52. The contact surface 72 of keeper 32 thus deviates from edge 22 of the structure 14 of the aircraft 10.

During the rotation of the keeper 32, the roller 42 moves from the first end 60 to the second end 62 of the curved profile 58. The stress applied to the spring 40 gradually decreases.

At the same time, once the pressure exerted by the operator on the thrust surface 80 has been released, the push button 34 returns to the position corresponding to the closed configuration, with the second stops 85 in contact with the bottom 51 of bracket 30.

With the roller 42 resting on the second end 62 of the curved profile 58, the open configuration of the latch 12 is obtained. As the contact surface 72 of the keeper has deviated from the structure 14 of the aircraft 10, the opening of the panel 18 is made possible.

The different radii of the various areas 60, 62, 64 of the curved profile 58 improve the rolling direction of the roller 42 in abutment with the moving profile of the keeper.

The absence of concave areas between the first end 60 and the second end 62 ensures that the moving surface, in this case the roller 42, will not be jammed in a concavity when pressure is applied to the push button 34 or when the keeper 32 is rotated around the first axis 52.

To re-lock the panel 18 in the closed configuration, the operator applies pressure on the keeper 32 to rotate the first tab 70 towards the second tab 83 to re-engage said tabs and re-establish the closed configuration of the latch 12. The contact surface 72 of keeper 32 is therefore brought back into contact with the structure 14 of the aircraft 10.

Such a locking mechanism allows for a relatively short range of movement between the open and closed configurations, represented by the difference between angles α and β. This minimal range of movement reduces the wear of the spring 40 over time, which therefore improves the service life of the latch.

For a variant, not shown in the latch 12 described above, the torsion spring 40 is replaced by a spring with a helical portion and two single-branched arms. Alternatively, the spring 40 is replaced by a leaf spring.

Embodying the moving surface of the latch 12 with a roller 42 is advantageous for reducing the friction forces and extending the service life of the spring. However, the moving surface is not necessarily equipped with a roller. In a variant, not shown, the end(s) 92 of the arm 86 can thus be bare, or covered with a lubricating sleeve, e.g. made of polytetrafluoroethylene, to facilitate the sliding connection between the end 92 of the spring and the curved profile 58 of the keeper. In another variant, each arm of the spring has a moving surface at or near the end of such arm, each moving surface being identical to or different from the other one.

The various elements of the latch 12 are preferably made of metal, such as aluminum or stainless steel to increase their strength and/or service life. Alternatively, some elements, such as the bracket, the keeper, or the push button, which are subject to lower mechanical stresses, can be made of plastic or composite material. The weight of the latch is thus reduced and, depending on the component, manufacturing is easier and/or faster.

The invention claimed is:

1. A latch for assembling a removable panel to a structure, said latch comprising:
  a bracket capable of being fastened to the structure;
  a keeper, supported on the bracket for pivoting around a first axis;
  a push button, supported on the bracket for pivoting around a second axis parallel to the first axis;
  a spring, comprising a first arm and a second arm connected by at least one intermediate portion, one end of each of said first and second arms in abutment respectively on the keeper and on the push button;
  the latch is movable between a closed configuration, in which the keeper is in contact with the push button, and an open configuration, in which the keeper is spaced apart from the push button; a first stress of the spring in the closed position is greater than a second stress of said spring in the open position;
  said latch being characterized in that:
    at least one intermediate portion of the spring is positioned around the second axis;
    the latch further comprises a moving surface supported adjacent an end of at least the first arm to be movable relative to the first arm and the keeper; and
    the keeper comprises a non-linear moving profile in contact with the moving surface in the closed and open configurations of the latch, said moving surface being capable of moving along the non-linear moving profile during the movement of the latch between the closed and open configurations.

2. The latch according to claim 1, wherein the moving surface comprises a roller rotatable at the end of the first arm, along a third axis parallel to the second axis.

3. The latch according to claim 1, in which the moving profile comprises a first end and second end, said second end is in contact with the moving surface in the open configuration, a distance between the first axis and the second end is less than a distance between the first axis and the first end.

4. The latch according to claim 3, in which the moving profile also comprises an intermediate area near the first end, a distance between the first axis and the second end is less than a distance between the first axis and the intermediate area.

5. The latch according to claim 1, in which a distance between the second axis and a third axis relative to which the moving surface is supported is less than a distance between the first axis and the second axis.

6. The latch according to claim 1, in which the first and second arms of the spring form a first angle ($\alpha$) in the closed configuration and a second angle ($\beta$) in the open configuration, a difference between the first and second angles is less than 60°.

7. The latch of claim 6 wherein the difference between the first and second angles is less than 30°.

8. The latch of claim 7 wherein the difference between the first and second angles is less than 20°.

9. The latch according to claim 2, in which the first arm of the spring comprises two substantially parallel branches, the roller is positioned between the two said branches.

10. The latch according to claim 1, in which the keeper comprises two walls traversed by the first axis.

11. The latch according to claim 10, in which the moving profile of the keeper comprises a part placed between the two walls and is fixed to said two walls.

12. An aircraft comprising: a structure; a panel movable relative to said structure; and a latch as stated in claim 1, said latch is attached to the panel such that in the closed configuration of the latch, said latch prevents the opening of the panel relative to the structure.

13. A latch for assembling a removable panel to a structure, said latch comprising:
- a bracket capable of being fastened to the structure;
- a keeper, supported on the bracket for pivoting around a first axis;
- a push button, supported on the bracket for pivoting around a second axis parallel to the first axis;
- a spring, comprising a first arm and a second arm connected by at least one intermediate portion, one end of each of said first and second arms in abutment respectively on the keeper and on the push button;
- the latch is movable between a closed configuration, in which the keeper is in contact with the push button, and an open configuration, in which the keeper is spaced apart from the push button; a first stress of the spring in the closed position is greater than a second stress of said spring in the open position;

said latch being characterized in that:
- at least one intermediate portion of the spring is positioned around the second axis;
- the latch further comprises a moving surface supported adjacent an end of at least the first arm to be movable relative to the first arm and the keeper; and
- the keeper comprises a moving profile in contact with the moving surface in the closed and open configurations of the latch, wherein the moving profile comprises a first end and second end, said second end is in contact with the moving surface in the open configuration, a distance between the first axis and the second end is less than a distance between the first axis and the first end, and wherein said moving surface being capable of moving along the moving profile during the movement of the latch between the closed and open configurations.

* * * * *